June 18, 1935.     J. DICKSON     2,005,536
AUXILIARY AIR ARRANGEMENT FOR DIESEL LOCOMOTIVES
Filed March 24, 1933     3 Sheets-Sheet 1

WITNESSES:

INVENTOR
JOHN DICKSON
BY
ATTORNEY

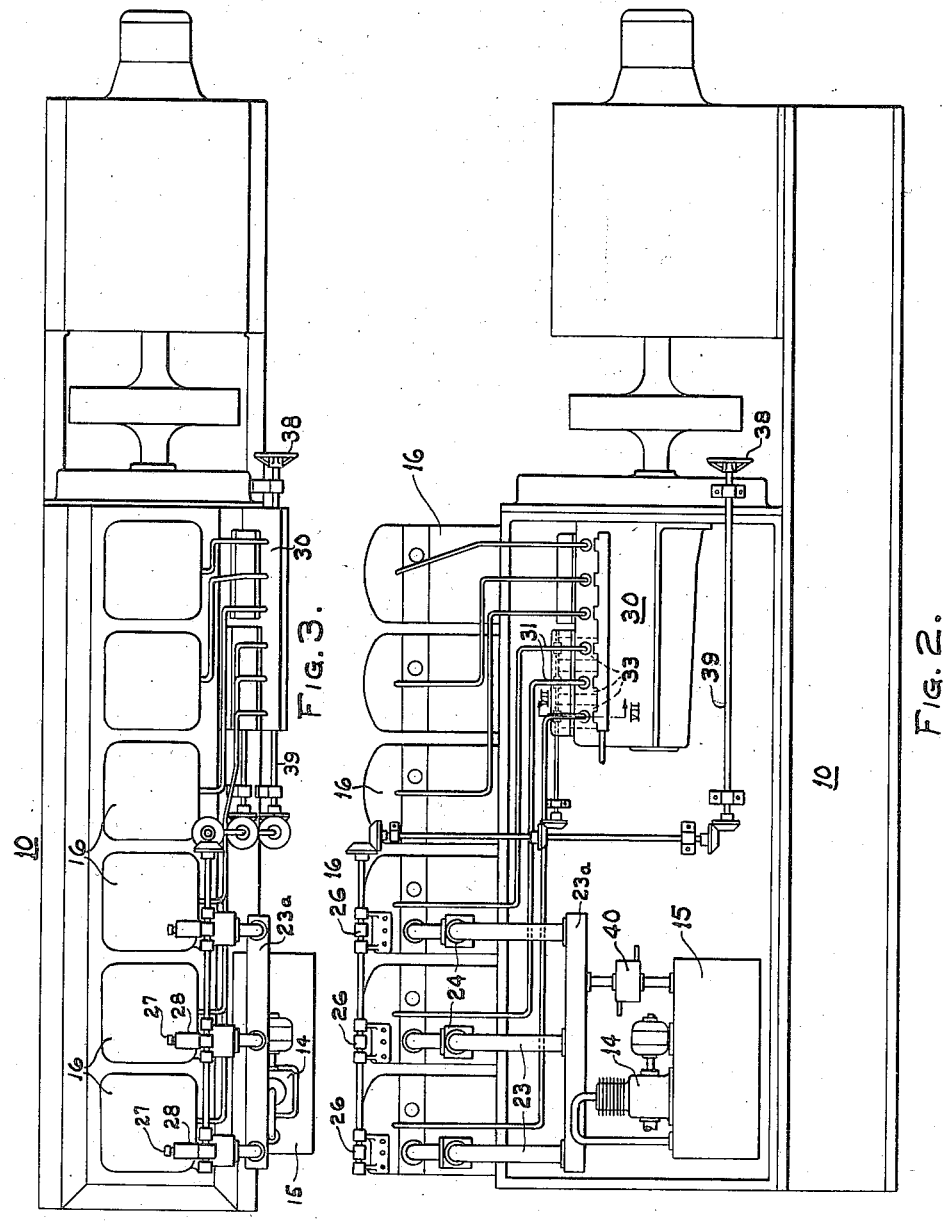

Patented June 18, 1935

2,005,536

UNITED STATES PATENT OFFICE 2,005,536

AUXILIARY AIR ARRANGEMENT FOR DIESEL LOCOMOTIVES

John Dickson, Swarthmore, Pa., assignor to Westinghouse Electric & Manufacturing Company, East Pittsburgh, Pa., a corporation of Pennsylvania Application March 24, 1933, Serial No. 662,588

3 Claims. (Cl. 123—198)

My invention relates to Diesel engine applications where the maintenance of a supply of compressed air is necessary, and it has for an object to modify one or more of the engine cylinders for compressor operation particularly to serve as a supplementary air supply source.

Where a Diesel engine is used for railway propulsion, particularly switching service, time is frequently consumed waiting for the usual air brake compressor to fill the air brake system with air to the required braking pressure. Obviously, the delay on this account depends upon the extent of air leakage in car or cars coupled to the locomotive and the number of cars coupled. It is customary for the engine operator, after coupling the car or cars to the engine, to wait for restoration of air pressure if the latter has been substantially lowered incident to coupling of the car or cars and the condition of air pressure thereof. In accordance with my invention, I reduce time consumed in this way by providing for one or more of the Diesel engine cylinders, acting as air compressor means to supplement the compressor means of the conventional air brake system, this result being possible due to the availability of the particular prime mover, a Diesel engine, for compressor operation, for, with this particular type of prime mover, pure air is drawn in on suction strokes and may be compressed and discharged to a suitable point by interrupting the fuel injection means and by providing special air discharge means. More particularly, I provide the compressor acting engine cylinder with a third valve serving, when opened, to afford communication between such cylinder and an air storage receptacle and, when closed, to interrupt such communication. Means is also provided for interrupting the supply of fuel to the compressor acting cylinder. Operating mechanism is arranged so that the third valve of the compressor acting cylinder may be opened and the fuel injection supply means thereto may be interrupted when such cylinder is operated as a compressor to serve as a supplementary source of air for the air brake system. A further object, therefore, is to provide apparatus having these features of advantageous construction and operation.

These and other objects are effected by my invention as will be apparent from the following description and claims taken in accordance with the accompanying drawings, forming a part of this application, in which:

Fig. 2 is a side elevation of the engine showing my improvement more in detail;

Fig. 3 is a plan view of apparatus shown in Fig. 2;

Figure 1:
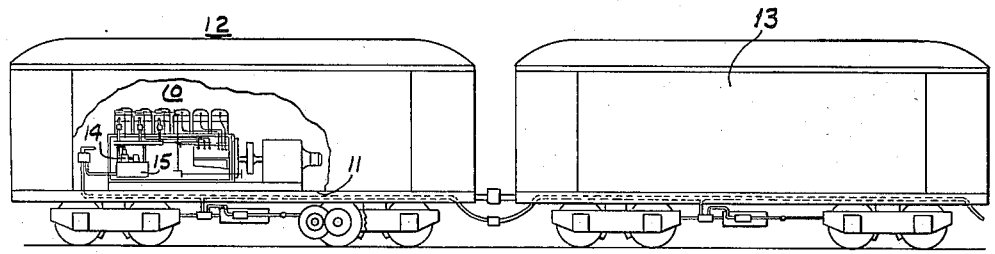
Fig. 1 is a side elevation of a Diesel engine driven locomotive having my improvement applied thereto.
Figure 6:
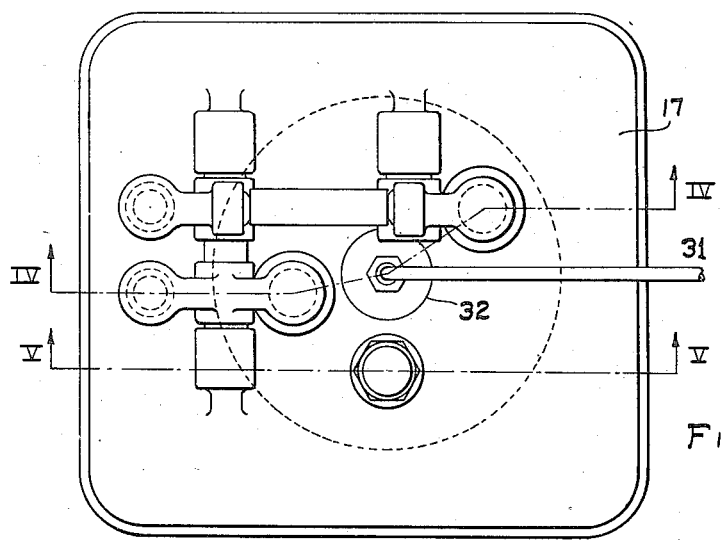
Fig. 6 is a plan view of a head with the cover removed.
Figure 7:
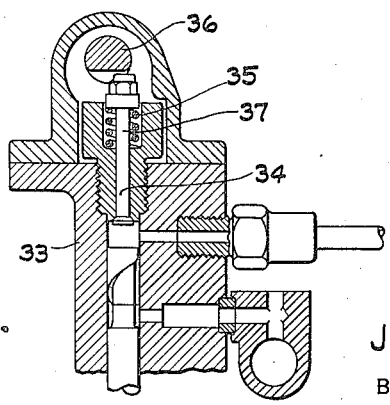
Fig. 7 is a detail sectional view taken along the line VII—VII of Fig. 2 and showing the means for rendering fuel injection to a compressor acting cylinder ineffective.
Figure 4:
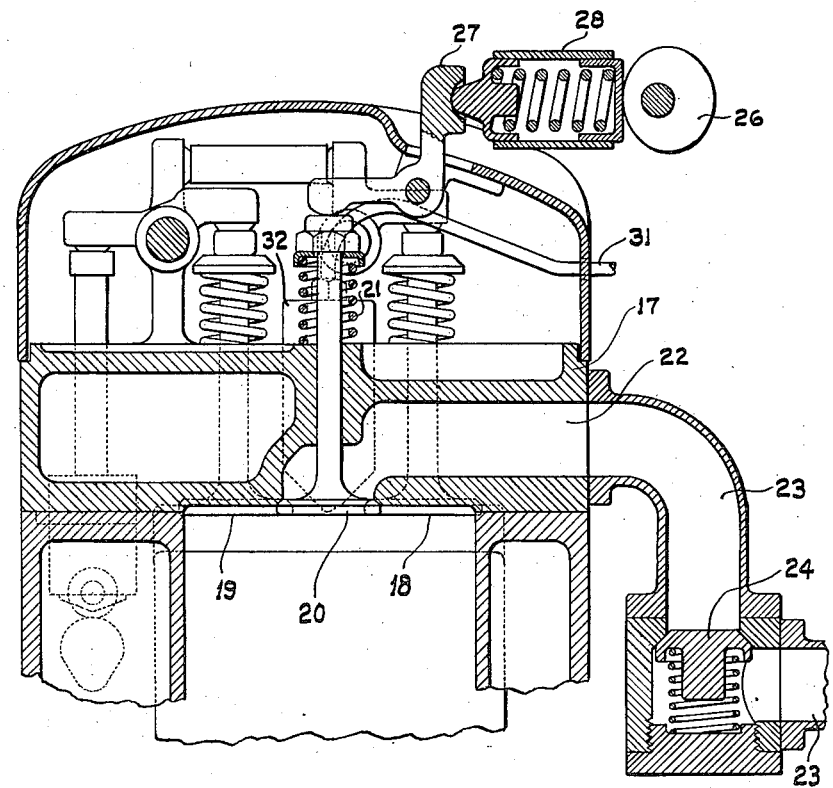
Fig. 4 is a sectional view of the head of a compressor-acting engine cylinder showing the third valve and taken along the line IV—IV of Fig. 6.
Figure 5:
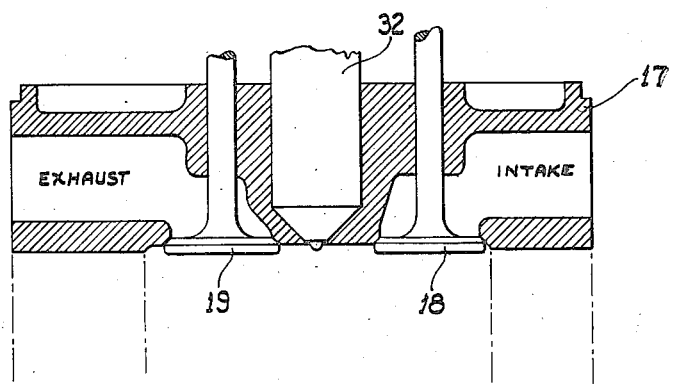
Fig. 5 is a sectional view taken along the line V—V of Fig. 6.

Referring now to the drawings more in detail, I show, at 10, a multiple cylinder Diesel engine mounted on a frame or car chassis 11 to provide a locomotive indicated generally at 12, the locomotive being arranged for coupling to one or more cars 13 in the usual way.

The locomotive 12 and the cars 13 are, of course, provided with the usual air brake system, such system commonly including a motor-operated air pump or compressor 14 arranged on the locomotive and supplying air to the air storage reservoir or receptacle 15. As already pointed out, when a locomotive is coupled to one or more cars, the air pressure will be reduced depending upon the number of cars coupled and the extent of pressure existing in the air brake apparatus of the respective cars at the time of coupling. Obviously, if there is no pressure in the air brake apparatus of a car or if there has been substantial leakage of air therefrom, then, upon coupling, the pressure of air of the air brake system will be lowered; and, if the pressure of the system is lowered below the normal operating point, the operator or driver must wait until the motor-operated compressor 14 can restore the pressure to the normal point. This restoration of air pressure may require several minutes and delays of as much as a half-hour on this account are not unusual. Accordingly, therefore, I provide for one or more cylinders of the engine 10 to operate as an air compressor to supplement the motor-operated compressor 14 whenever necessary and the apparatus providing for this dual operation of one or more of the cylinders will now be described.

The engine 10 includes a plurality of cylinders 16, for example, six, and each cylinder has a head 17 provided with admission and exhaust valves 18 and 19. As shown on the drawings, the three cylinders at the left of Fig. 2 are shown as modified for compressor operation, it being understood, of course, that a less number of cylinders may be so modified, the only requirement being that enough unmodified cylinders shall remain to secure good engine operation with the modified cylinders acting as air compressors. The heads of the compressor acting cylinders are each provided with a third valve 20 of the poppet type and opening inwardly, the valve being normally closed due to the force of a spring 21. The valve 20 interrupts or affords communication with a passage 22 formed partly in a head 17 and partly in a conduit 23 leading to the manifold 23a connected to the receiver 15. Each of the conduits 23 is provided with a non-return valve 24 preventing the back-flow of air from the receiver to an engine cylinder when the third valve 20 is opened, whereby it is assured that the pressure of air of the compressor-acting cylinder or cylinders must preponderate over the receiver pressure before air can be supplied from the engine cylinder or cylinders to the receiver.

The third valves 20 may be opened in any suitable manner. By way of example, I show mechanism for opening these valves including a cam 26 operating bell cranks 27 for depressing the valves 20 to open the latter. Preferably, the operating mechanism for opening the valves includes energy storage means to overcome the spring 21 and to open the valve 20 at a time when the resistance to opening of the latter is a minimum, this making it possible to operate the cam 26 to compressor-acting position with subsequent opening of a valve 20 if at the instant the particular engine cylinder should be under compression. To this end, I show a spring device 28 arranged in the mechanism between the cam 26 and the valve 20 and which, being stronger than the spring 21, is effective to store energy if, at the instant of operation of the cam 26, a valve 20 cannot then be readily opened due to pressure conditions existing in the cylinder. When the cylinder pressure is reduced, then the excess force of the spring device 28 over the spring 21 is effective to open the valve 20.

The engine 10 is provided with fuel injection apparatus of a well-known type indicated generally, at 30, such apparatus including a fuel injection pump for each of the cylinders and the pumps being connected to the latter by conduits 31 terminating in fuel injectors 32 provided in the heads 17. The engine cylinders arranged for compressor operation have their fuel injection pumps modified so that they may be rendered ineffective when compressor operation of the cylinders takes place. To this end, I show the three fuel injection pumps 33 connected to the compressor acting cylinders having by-pass valves 34 arranged in the heads thereof, these valves being normally closed by springs 35 and normally opened by a cam 36 cooperating with the stems 37 thereof. The cam 36 may be turned to open the valve against the force of the springs 35.

Common operating mechanism is arranged to secure simultaneous opening of the third valves of the compressor acting cylinders and to interrupt the supply of fuel to such cylinders. To this end, I show the cams 26 and 36 connected to a manual control device 38, the latter device being shown, for example, as a hand wheel which operates a shaft 39 connected by gearing to the cams 26 and 36. It is to be understood that any suitable mechanism may be employed for opening the third valves and for rendering the fuel injection devices of the compressor acting cylinders ineffective and that any suitable means may be employed for securing simultaneous opening of the third valves and interruption of the fuel injection devices. If desired, the heat of compression in air delivered from the compressor acting cylinders to the receiver 15 may be removed by a suitable heat exchanger 40 which preferably transfers heat to circulating water.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. The combination with a multiple cylinder Diesel engine provided with means for injecting fuel into the cylinders and a receptacle normally containing air under pressure, each of the engine cylinders having an air admission and exhaust valves, of means for utilizing at least one of the engine cylinders and its air admission valve as a compressor to supply air on compression strokes to said receptacle including a passage connected to the receptacle, a check valve in said passage preventing back-flow of air to the engine, a third valve for the compressor-acting engine cylinder which, when opened, affords communication between the cylinder and the passage and, when closed, interrupts such communication, means for rendering the fuel injection means ineffective to inject fuel into the compressor-acting cylinder, and controlling mechanism for opening said third valve and for operating the last-named means to interrupt the supply of fuel to the compressor-acting cylinder and vice versa.

2. The combination as claimed in claim 1 wherein the third valve is provided with a spring for maintaining it closed when the compressor-acting cylinder is operated as an engine cylinder.

3. The combination with a multiple cylinder Diesel engine and an air receptacle normally supplied by a motor compressor unit, each of the engine cylinders having a head provided with a fuel injector and having an air admission and exhaust valves, and means for individually supplying fuel to the fuel injectors; of means for utilizing at least one of the engine cylinders and its air admission valve as a compressor to provide a supplementary source of air supply for said receptacle including a passage formed partly in the head of such cylinder and connecting the latter to the receptacle, a non-return valve in the passage preventing back-flow from the receptacle to the engine, a third valve provided in the head of the compressor-acting cylinder and serving, when opened, to afford communication between the cylinder and the passage and, when closed, to interrupt such communication, means for rendering the fuel supply means ineffective to supply fuel to the compressor-acting cylinder, and controlling mechanism for simultaneously opening said third valve and for operating the last-named means to interrupt the supply of fuel to the compressor-acting engine cylinder when the latter is operated as a compressor.

JOHN DICKSON.